United States Patent
Cueppers et al.

(10) Patent No.: US 9,777,833 B2
(45) Date of Patent: Oct. 3, 2017

(54) METHOD AND CONTROL DEVICE FOR OPERATING AN AUTOMATIC TRANSMISSION

(71) Applicant: ZF Friedrichshafen AG, Friedrichshafen (DE)

(72) Inventors: Ruben Cueppers, Wangen (DE); Markus Maurer, Lindau (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 109 days.

(21) Appl. No.: 14/965,160

(22) Filed: Dec. 10, 2015

(65) Prior Publication Data
US 2016/0169378 A1  Jun. 16, 2016

(30) Foreign Application Priority Data
Dec. 10, 2014 (DE) .......... 10 2014 225 453

(51) Int. Cl.
*F16H 61/04* (2006.01)

(52) U.S. Cl.
CPC ... *F16H 61/0403* (2013.01); *F16H 2061/047* (2013.01); *F16H 2061/0474* (2013.01)

(58) Field of Classification Search
None
See application file for complete search history.

(56) References Cited

U.S. PATENT DOCUMENTS

| | | | |
|---|---|---|---|
| 8,496,562 B2 | 7/2013 | Arnold et al. | |
| 8,777,807 B2 | 7/2014 | Schneider et al. | |
| 9,086,146 B2 | 7/2015 | Arnold et al. | |
| 2004/0118652 A1* | 6/2004 | Muetzel | B60W 30/1819 192/3.55 |
| 2008/0248923 A1* | 10/2008 | Otsubo | F16H 61/0403 477/124 |
| 2010/0105517 A1* | 4/2010 | Borntraeger | F16H 3/126 477/3 |
| 2015/0167838 A1 | 6/2015 | Steinhauser et al. | |

FOREIGN PATENT DOCUMENTS

| | | |
|---|---|---|
| DE | 102009000253 A1 | 7/2010 |
| DE | 102009056793 A1 | 6/2011 |
| DE | 102010040159 A1 | 3/2012 |
| DE | 102010063029 A1 | 6/2012 |
| DE | 102011017741 A1 | 10/2012 |
| DE | 1020122116763 A1 | 1/2014 |

OTHER PUBLICATIONS

German Search Report for DE102014225453, dated Sep. 25, 2015, 7 pages.

* cited by examiner

*Primary Examiner* — Edwin A Young
(74) *Attorney, Agent, or Firm* — Dority & Manning, P.A.

(57) ABSTRACT

A method for operating an automatic transmission includes determining at least one of an elapsed time from adjusting a first one of at least one positive-locking shift element towards a closed configuration or a differential speed rotation of the first one of the at least one positive-locking shift element and shifting the automatic transmission to a substitute gear if the elapsed time from adjusting the first one of the at least one positive-locking shift element towards the closed configuration reaches or exceeds a time limit and/or the differential speed rotation of the first one of the at least one positive-locking shift element reaches or exceeds a rotational speed limit. A related transmission control device for an automatic transmission is also provided.

12 Claims, 2 Drawing Sheets

METHOD AND CONTROL DEVICE FOR OPERATING AN AUTOMATIC TRANSMISSION

FIELD OF INVENTION

The invention relates generally to a method for operating an automatic transmission. Furthermore, the invention relates generally to a transmission control device of an automatic transmission.

BACKGROUND

A method for operating an automatic transmission is known from DE 10 2009 000 253 A1. Thus, under this state of the art, for engaging a target gear in the automatic transmission, a positive-locking shifting element that is open in the actual operating state and locked in the target gear of the automatic transmission is at least approximately synchronized by increasing the transmission capacity of a frictional-locking shifting element, whereas the frictional-locking shifting element used for the synchronization of the positive-locking shifting element is not locked either in the actual operating state or in the target gear of the automatic transmission. When a defined operating state of the automatic transmission is reached, the positive-locking shifting element that is at least approximately synchronized with the assistance of the frictional-locking shifting element is driven to lock.

Upon the locking of a positive-locking shifting element, the situation may arise that the positive-locking shifting element cannot be locked, but occupies an intermediate position, such as a tooth-on-tooth position or a clamp position. If it is then recognized that, after driving the positive-locking shifting element, it is not locked, but occupies an intermediate position, in the method known from practice, measures are taken to release the intermediate position. This causes delays in the buildup of traction, which limits vehicle availability, for example upon start-up. This is disadvantageous.

As such, there is a need to increase vehicle availability, particularly upon the detection of an intermediate position for a positive-locking shifting element to be locked.

SUMMARY OF THE INVENTION

The present invention is directed to a method for operating an automatic transmission and a transmission control device for carrying out the method. Additional objectives and advantages of the invention set will be set forth in part in the following description, or may be obvious from the description, or may be learned through practice of the invention.

In accordance with an exemplary embodiment of the invention, after the driving of the positive-locking shifting element to the locking of the same, the time elapsed after the driving of the positive-locking shifting element to locking and/or a differential rotational speed at the positive-locking shifting element is determined, whereas, if the time elapsed after the driving of the positive-locking shifting element to locking reaches or exceeds a time limit, and/or the differential rotational speed at the positive-locking shifting element reaches or exceeds a rotational speed limit, the positive-locking shifting element is not locked any further, but the automatic transmission is shifted to a substitute gear, in which the positive-locking shifting element does not participate in the transmission of power. In accordance with an exemplary embodiment of the invention, vehicle availability can be increased. After the expiration of a timer or a time monitor and/or upon reaching or exceeding a rotational speed limit for the differential rotational speed at the positive-locking shifting element, the locking of the positive-locking shifting element is discontinued and the transmission is shifted to a substitute gear, in which the positive-locking shifting element does not participate in the transmission of power.

According to an additional exemplary form of the present subject matter, at least the time elapsed after driving of the positive-locking shifting element to locking is determined, whereas, if the time elapsed after the driving of the positive-locking shifting element to locking reaches or exceeds the time limit, the automatic transmission is shifted to the substitute gear. Preferably, the differential rotational speed at the positive-locking shifting element is also determined, whereas, if the differential rotational speed reaches or exceeds the rotational speed limit prior to reaching or exceeding the time limit, the automatic transmission is shifted to the substitute gear. Thereby, vehicle availability can be increased in a particularly advantageous manner.

According to a further additional exemplary form of the present subject matter, upon reaching or exceeding the time limit and/or reaching or exceeding the rotational speed limit, measures for releasing an intermediate position of the positive-locking shifting element are ended, and the automatic transmission is shifted to the substitute gear. Thereby, the time until the buildup of traction in the automatic transmission can be reduced, and vehicle availability is increased.

Preferably, the substitute gear in the automatic transmission remains shifted until the positive-locking shifting element is engaged, whereas only then is a gear change permitted. Further gearshifts are permitted only if the positive-locking shifting element, which does not participate in the substitute gear in the transmission of power, can be locked. In this way, the immobilization of the vehicle can be avoided.

BRIEF DESCRIPTION OF THE DRAWINGS

Exemplary embodiments of the invention are, without any limitation, more specifically described by means of the drawings.

Thereby, the following is shown.

DETAILED DESCRIPTION

Figures 1, 2:
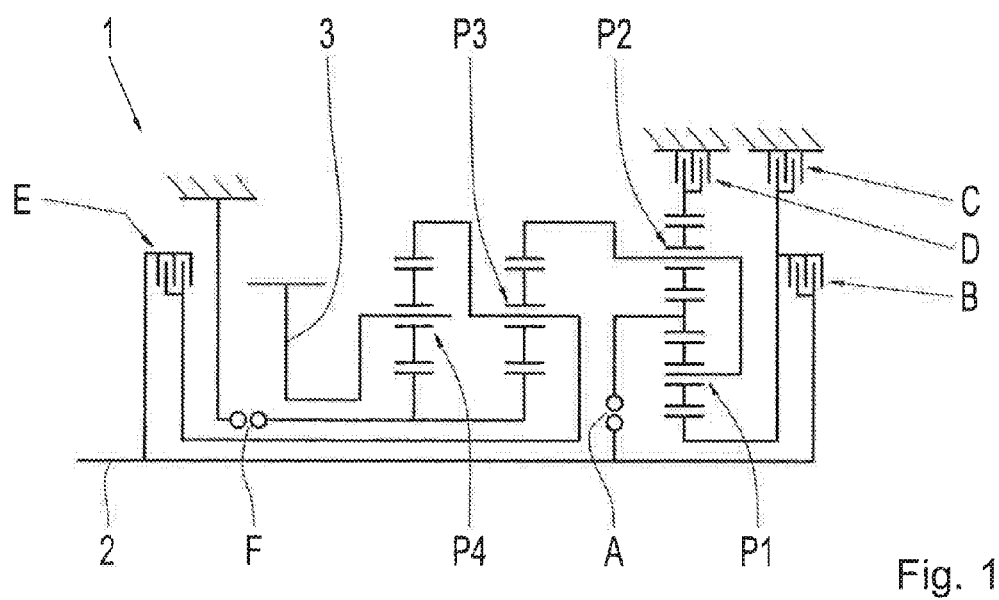
FIG. 1 provides a transmission diagram of an automatic transmission according to an exemplary embodiment of the present subject matter.
FIG. 2 provides an exemplary shifting matrix for the exemplary automatic transmission of FIG. 1.

Reference will now be made to embodiments of the invention, one of more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Exemplary aspects of the invention concern a method and control device for operating an automatic transmission.

FIG. 1 shows an exemplary transmission diagram of an automatic transmission 1 with a transmission input shaft 2, a transmission output shaft 3 and several planetary gear sets P1, P2, P3 and P4 situated between the transmission input shaft 2 and the transmission output shaft 3.

Furthermore, the automatic transmission 1 includes a plurality of shifting elements A, B, C, D, E and F, whereas the shifting elements A and F are positive-locking shifting elements and the shifting elements C, D, B and E are frictional-locking shifting elements. The frictional-locking shifting elements C and D are designed as brakes and the frictional-locking shifting elements B and E are designed as clutches.

The positive-locking shifting elements F and A are claw shifting elements.

In each engaged gear of the automatic transmission 1, a first group of shifting elements are locked and a second group of shifting elements are open. Thus, it can be seen from the exemplary shifting matrix of FIG. 2 that, in each engaged gear, three first shifting elements are locked and three second shifting elements are open, whereas the locked shifting elements in FIG. 2 are indicated by a dot. Thus, three shifting elements are locked and three shifting elements are open in both the forward gears 1 to 9 and in the reverse gear R. In the transmission state of neutral (N), in which no gear is engaged, if two shifting elements are locked; with the automatic transmission 1 of FIG. 1, they are the frictional-locking shifting element D and the positive-locking shifting element F.

If the automatic transmission of FIG. 1 is transferred starting from the actual operating state of neutral N as a target gear to a starting gear, for example to the forward gear 1, in addition to the already locked shifting elements D and F, which are locked in the transmission state of neutral N, the positive-locking shifting element A is locked.

The approach in this regard known from the state of the art is described below with reference to FIG. 3, whereas several chronological curve progressions are shown over time t in FIG. 3.

Figure 3:
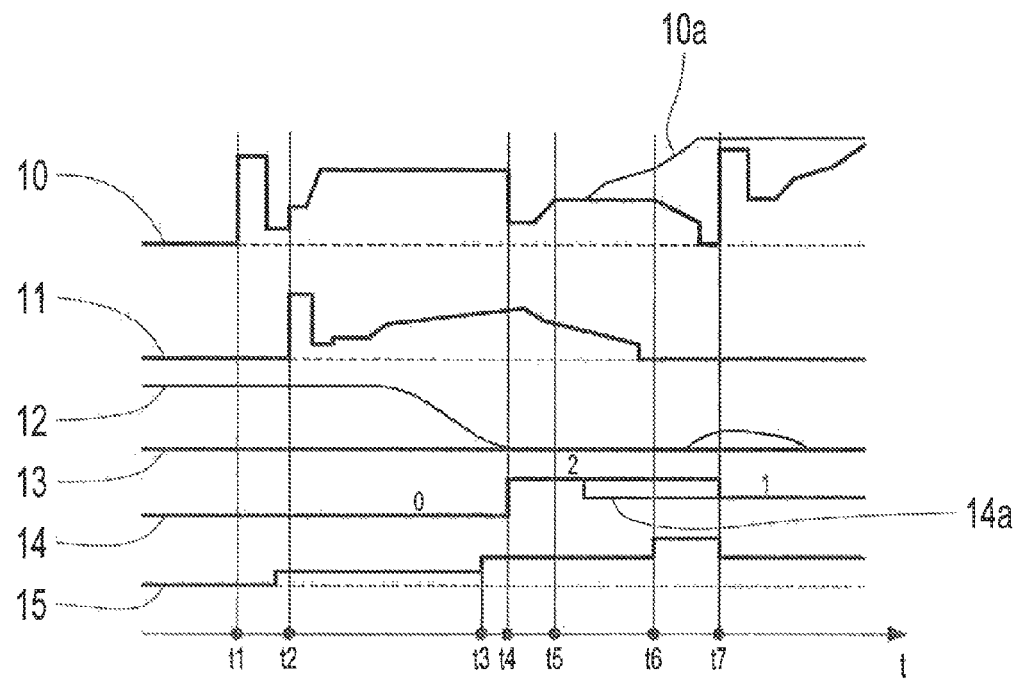
FIG. 3 provides chronological curve progressions for the clarification of a method, known from the state of the art, for operating an automatic transmission.

Thus, FIG. 3 shows, with the curve progression 10, the pressure control for the frictional-locking shifting element D, with the curve progression 11, the pressure control for the frictional-locking shifting element E, with the curve progression 12, a transmission input rotational speed curve progression at the transmission input shaft 2, with the curve progression 13, a transmission output rotational speed curve progression at the transmission output shaft 3, with the curve progression 14, the position of the positive-locking shifting element A to be locked and, with the curve progression 15, the pressure control for the positive-locking shifting element A to be locked.

At the point in time t1, it is assumed that, on the control side, the engagement of the starting gear 1 is requested as the target gear, whereas, at the point in time t1, in accordance with the curve progression 10 for the transfer of the automatic transmission 1 into neutral N, the positive-locking shifting element D is initially locked. In FIG. 3, the state of the positive-locking shifting element F is not shown, but it is assumed that, beginning at the point in time t1, the same is completely locked at any point in time.

In order to, starting from the actual operating state of neutral N for locked shifting elements D and F in the automatic transmission 1, engage the forward gear 1 as the target gear for starting, the positive-locking shifting element A must be subsequently locked, whereas, beginning at the point in time t2, the same is at least approximately synchronized, i.e. by increasing the transmission capacity of the frictional-locking shifting element E (see curve progression 11), whereas the frictional-locking shifting element E used for synchronizing the positive-locking shifting element A is not locked either in the actual operating state of the automatic transmission 1 or in the target gear of the automatic transmission 1 to be engaged.

In FIG. 3, it is assumed that, at the point in time t3, the positive-locking shifting element A has been sufficiently synchronized, such that, in accordance with the curve progression 15, at the point in time t3, the control pressure for the positive-locking shifting element A is increased, and whereas the positive-locking shifting element A at the point in time t4 is actually driven to lock.

It can be seen from the curve progression 14 that, with the point in time t4, the positive-locking shifting element A leaves its completely open condition, which is characterized in FIG. 3 with state 0, whereas it is further assumed in FIG. 3 that the positive-locking shifting element A cannot be completely locked, but is transferred into an intermediate position, which is marked in FIG. 3 by the state 2. The position or location of the positive-locking shifting element A to be locked can be detected, for example, by an end limit sensor or a displacement sensor.

If it is detected that, after driving the positive-locking shifting element A at the point in time t4, the same cannot be locked, so that, at the point in time t5, an intermediate position is still occupied by the positive-locking shifting element A, measures following the state of the art are taken in order to release this intermediate position, i.e., according to the state of the art, between the points in time t5 and t6, measures to release a so-called "tooth-on-tooth position," and, if such measures are not successful, between the points in time t6 and t7, measures to release a clamp on the positive-locking shifting element A.

The curve progressions 10a, 14a of FIG. 3 arise if the measures to release the tooth-on-tooth position between the points in time t5 and t6 have been successful.

In FIG. 3, it is assumed that, no later than the point in time t7, the intermediate position at the positive-locking shifting element could be released, such that the same then occupies the final position, which is marked in FIG. 3 by the state 1.

Therefore, according to the state of the art, for the locking of the positive-locking shifting element A, the same is initially synchronized, i.e. through a frictional-locking shifting element E, which is not locked either in the actual operating state of neutral N or in the engaged target gear, i.e. in one of the forward gears 1, 2 or 3.

After the synchronization of the positive-locking shifting element A, the same is driven to lock, whereas if it is then determined according to the state of the art that the same occupies an intermediate position and accordingly could not be locked, measures are taken to release this intermediate position, i.e. initial measures to release a tooth-on-tooth position and, if applicable, if the measures to release a tooth-on-tooth position have not been successful, subsequent measures to release a clamp on the positive-locking shifting element A to be locked. Such measures require time, by which the buildup of traction in the automatic transmission is delayed and the availability of the motor vehicle is restricted.

Exemplary aspects of the invention concerns details, by means of which the buildup of traction in the automatic transmission can be shortened, and the availability of the motor vehicle can be increased.

Details of the method in accordance with exemplary aspects of the invention are described below with reference to FIG. 4, whereas several curve progressions are in turn shown over time t in FIG. 4.

Figure 4:
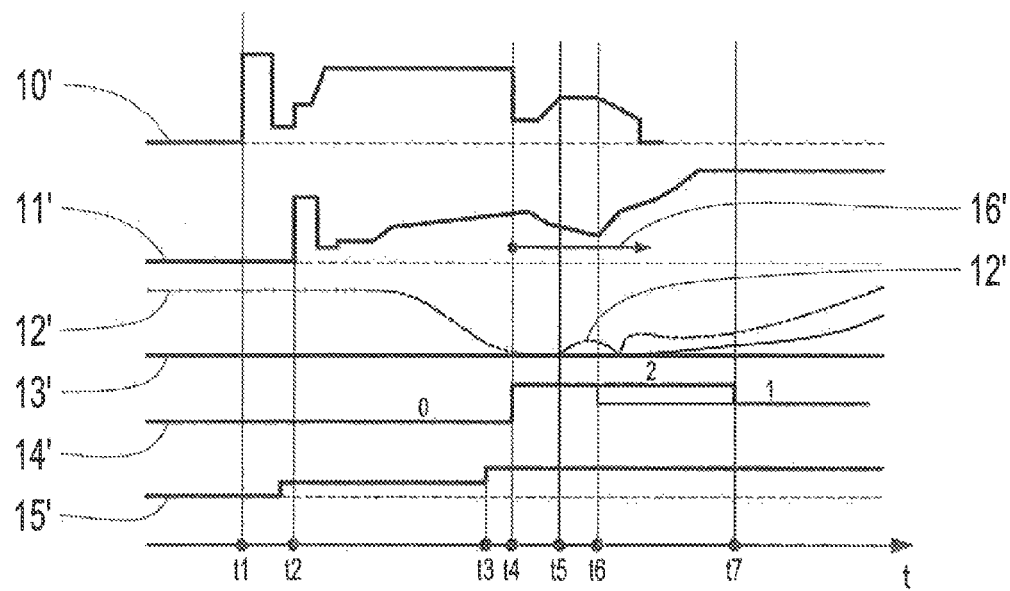
FIG. 4 provides chronological curve progressions for the clarification of the method in accordance with an exemplary embodiment of the invention for operating an automatic transmission.

Thus, FIG. 4 shows, with the curve progression 10', a pressure control for the frictional-locking shifting element D, with the curve progression 11', a pressure control for the frictional-locking shifting element E, with the curve progression 12', a transmission input rotational speed curve progression at the transmission input shaft 2 of the transmission 1, with the curve progression 13', a transmission output rotational speed curve progression at the transmission output shaft 3 of the transmission 1, with the curve progression 14', the position of the positive-locking shifting element A to be locked and, with the curve progression 15', the pressure control for the positive-locking shifting element A to be locked.

Moreover, it is assumed in FIG. 4 that, beginning at the point in time t1, through the pressure control of the frictional-locking shifting element D, the automatic transmission 1 is initially transferred to the actual operating state of neutral N, whereas, although not shown in FIG. 4, the positive-locking shifting element F is completely locked at the point in time t1 and all subsequent points in time.

Subsequently, for the transfer of the automatic transmission from the actual state of neutral N to the target gear, i.e. to the starting gear forward gear 1, the positive-locking shifting element A is to be locked, whereas, beginning at the point in time t2, the same is synchronized through the control of the positive-locking shifting element E, whereas this frictional-locking shifting element E is not locked either in the actual state of the automatic transmission 1 or in the target gear of the same.

In FIG. 4, it is in turn assumed that, at the point in time t3, the positive-locking shifting element A has been sufficiently synchronized, such that, at the point in time t3, in accordance with the curve progression 15', the pressure control for the same is increased and, at the point in time t4, the same is driven to lock.

In accordance with exemplary aspects of the invention, with the control of the positive-locking shifting element A, for the locking of the same, the time elapsed after driving the positive-locking shifting element A to lock the same and/or a differential rotational speed at the positive-locking shifting element A is monitored, whereas if the time elapsed after driving the positive-locking shifting element A to locking reaches or exceeds a time limit and/or if the differential rotational speed at the positive-locking shifting element A to be locked reaches or exceeds a rotational speed limit, the positive-locking shifting element A is not locked any further, but the automatic transmission 1 is shifted to a substitute gear, in which the positive-locking shifting element A does not participate in the transmission of power. In FIG. 4, the monitoring of the time after driving the positive-locking shifting element A to the locking of the same is visualized by an arrow 16'.

Preferably, at least the time elapsed after driving the positive-locking shifting element to the locking of the same is recorded, whereas, if the time lapsed after driving the positive-locking shifting element to locking reaches or exceeds the time limit, the automatic transmission 1 is shifted to the substitute gear. In particular, the differential rotational speed at the positive-locking shifting element is also monitored for this purpose, whereas, if, prior to reaching or exceeding the time limit, the differential rotational speed reaches or exceeds the rotational speed limit, the automatic transmission is shifted to the substitute gear.

The rotational speed limit is preferably dependent on the difference between the transmission input rotational speed and the transmission output rotational speed. If the differential rotational speed at the positive-locking shifting element deviates by more than a threshold value from the difference between the transmission input rotational speed and transmission output rotational speed, the automatic transmission 1 is shifted to the substitute gear.

In the embodiment shown in FIG. 4, as can be seen from the arrow 16', after driving the positive-locking shifting element to the locking of same at the point in time t4, a time monitoring function is started with a timer; thus, the time elapsed after driving the positive-locking shifting element to the locking of the same is monitored. In addition, the differential rotational speed at the positive-locking shifting element is monitored, whereas, in FIG. 4, an increase in the transmission input rotational speed at the transmission input shaft 2 in accordance with the curve progression 12' is determined between the points in time t5 and t6. Through the comparison of the differential rotational speed at the positive-locking shifting element A with the difference between the transmission input rotational speed and transmission output rotational speed, it is thereupon concluded that the differential rotational speed at the positive-locking shifting element A to be locked reaches or exceeds the rotational speed limit.

This is taken as an indicator that the positive-locking shifting element A, which at the point in time t4 was driven to locking, could not be completely locked; rather, it occupies an intermediate position, such that, in accordance with exemplary aspects of the invention, there are no further attempts to lock the positive-locking shifting element A. Rather, beginning at the point in time t6, the automatic transmission 1 is shifted to the substitute gear, in which the positive-locking shifting element A does not participate in the transmission of power. For this purpose, in accordance with FIG. 4, the positive-locking shifting element E used for synchronization is completely locked according to the curve progression 11', and the frictional-locking shifting element D that is locked in the actual target gear is completely open. The automatic transmission 1 of FIG. 1 is transferred to a modified forward gear 4 as a substitute gear, in which the frictional-locking shifting element E used for synchronization and the positive-locking shifting element F are locked, but in which the positive-locking shifting element A does not participate in the transmission of power.

Thus, with the automatic transmission of FIG. 1, in the forward gear 4, the torque or force can also be transferred starting from the transmission input shaft 2 in the direction of the transmission output shaft 3, if the shifting element A is open for the locked shifting elements E and F. Accordingly, with the transfer of the automatic transmission 1 to the modified forward gear 4 as a substitute gear for locked shifting elements E and F and open shifting element A, a start-up can take place, by which the availability of the motor vehicle is increased when compared to the state of the art. Preferably, upon reaching or exceeding the time limit or reaching or exceeding the rotational speed limit, measures to release an intermediate position at the positive-locking shifting element are ended and the automatic transmission is shifted to the substitute gear.

If the automatic transmission is shifted into the modified substitute gear 4, in which only the shifting elements E and F are locked, while the shifting element A is open, in order to avoid the immobilization of the motor vehicle, the modified forward gear 4 remains shifted as a substitute gear in the automatic transmission 1 until the positive-locking shifting element A is engaged; only then is a gear change permitted.

In FIG. 4, this is the case at the point in time t7, whereas, in accordance with the curve progression 15', the pressure control for the positive-locking shifting element A is maintained, in order to ultimately engage the same and completely lock it.

Only if the positive-locking shifting element A has been engaged and therefore the forward gear 4 shown in the shifting matrix of FIG. 2 is engaged through the locking of the positive-locking shifting element A can subsequent upshifts or downshifts of adjacent forward gears take place.

A more secure buildup of traction in the automatic transmission 1 is possible for the method in accordance with exemplary aspects of the invention, particularly if the position of the positive-locking shifting element also cannot be detected. By using a substitute gear, in which the positive-locking shifting element A to be locked does not participate in the transmission of power, the buildup of traction in the automatic transmission 1 can be shortened, and the availability of the motor vehicle can be increased.

Within the framework of an emergency program strategy, for forward travel, the automatic transmission 1 can be operated in the modified forward gear 4 described above, with locked shifting elements F and E along with open shifting element A; for reverse travel, the same can be operated with locked shifting elements F, B, D. The positive-locking shifting element F can be locked when the vehicle is stationary or nearly stationary, or upon starting the engine. An intermediate position at the positive-locking shifting element F can be avoided, when selecting forward travel, by driving the shifting element E and, when selecting reverse travel, by driving the shifting elements B or D. After the expiration of a timer or if the drawing in of rotational speed for the transmission input rotational speed is detected, the control pressure subsequently can be increased for the positive-locking shifting element to be locked, in order to lock the same, whereas the same can be engaged by increasing the control pressure for the positive-locking shifting element to be locked. For switching from forward travel to reverse travel, or conversely from reverse travel to forward travel, only frictional-locking shifting elements are then shifted. In the course of an emergency program, this can increase the availability of the transmission and thus the motor vehicle.

The invention further relates to a transmission control device for carrying out the method in accordance with exemplary aspects of the invention. The transmission control device controls the modules that participate in the carrying out of the method in accordance with exemplary aspects of the invention and has data interfaces for this purpose. Further, the transmission control device has a data memory for storing data and a processor for data processing. In addition to such hardware tools of the transmission control device, program modules for carrying out the method in accordance with exemplary aspects of the invention are implemented in the same as software tools.

Modifications and variations can be made to the embodiments illustrated or described herein without departing from the scope and spirit of the invention as set forth in the appended claims.

REFERENCE SIGNS

1 Automatic transmission
2 Transmission input shaft
3 Transmission output shaft
10, 10' Control of the frictional-locking shifting element
11, 11' Control of the frictional-locking shifting element
12, 12' Transmission input rotational speed
13, 13' Transmission output rotational speed
14, 14' Position of the positive-locking shifting element
15, 15' Control pressure of the positive-locking shifting element
16' Time monitor
A Positive-locking shifting element
B Frictional-locking shifting element
C Frictional-locking shifting element
D Frictional-locking shifting element
E Frictional-locking shifting element
F Positive-locking shifting element
P1 Planetary gear set
P2 Planetary gear set
P3 Planetary gear set
P4 Planetary gear set

The invention claimed is:

1. A method for operating an automatic transmission having a plurality of friction-locking shift elements and at least one positive-locking shift element, comprising:
  initiating a shift of the automatic transmission from an initial gear to a subsequent gear, a first one of the plurality of friction-locking shift elements being open in the initial gear and the subsequent gear of the automatic transmission, a first one of the at least one positive-locking shift element being open in the initial gear and closed in the subsequent gear of the automatic transmission;
  increasing a transmission capacity of the first one of the plurality of friction-locking shift elements during the shift of the automatic transmission from the initial gear to the subsequent gear such that the first one of the at least one positive-locking shift element synchronizes;
  adjusting the first one of the at least one positive-locking shift element towards a closed configuration after synchronizing the first one of the at least one positive-locking shift element with the first one of the plurality of friction-locking shift elements;
  determining at least one of an elapsed time from adjusting the first one of the at least one positive-locking shift element towards the closed configuration or a differential speed rotation of the first one of the at least one positive-locking shift element; and
  shifting the automatic transmission to a substitute gear when:
    (1) the elapsed time from adjusting the first one of the at least one positive-locking shift element towards the closed configuration reaches or exceeds a time limit;
    (2) the differential speed rotation of the first one of the at least one positive-locking shift element reaches or exceeds a rotational speed limit; or
    (3) both the elapsed time from adjusting the first one of the at least one positive-locking shift element towards the closed configuration reaches or exceeds the time limit and the differential speed rotation of the first one of the at least one positive-locking shift element reaches or exceeds the rotational speed limit,
  wherein the first one of the at least one positive-locking shift element does not participate in the transmission of power between an input shaft and an output shaft of the automatic transmission in the substitute gear.

2. The method of claim 1, wherein the first one of the at least one positive-locking shift element is not locked any further when the elapsed time from adjusting the first one of the at least one positive-locking shift element towards the closed configuration reaches or exceeds the time limit or when the differential speed rotation of the first one of the at least one positive-locking shift element reaches or exceeds the rotational speed limit.

3. The method of claim 1, wherein at least the elapsed time from adjusting the first one of the at least one positive-locking shift element towards the closed configuration is determined, wherein the automatic transmission is shifted to the substitute gear when the elapsed time from adjusting the first one of the at least one positive-locking shift element towards the closed configuration reaches or exceeds the time limit.

4. The method of claim 3, wherein the differential rotational speed of the first one of the at least one positive-locking shift element is also determined, wherein, the automatic transmission is shifted to the substitute gear when, prior to reaching or exceeding the time limit, the differential rotational speed reaches or exceeds the rotational speed limit.

5. The method of claim 1, further comprising terminating measures for releasing the first one of the at least one positive-locking shift element from an intermediate position upon reaching or exceeding the time limit, upon reaching or exceeding the rotational speed limit, or upon both reaching or exceeding the time limit and reaching or exceeding the rotational speed limit.

6. The method of claim 1, wherein the automatic transmission remains in the substitute gear until the first one of the at least one positive-locking shift element fully closes.

7. A transmission control device for an automatic transmission having a plurality of frictional-locking shift elements and at least one positive-locking shift element, the transmission control device comprising
a processor; and
a memory storing computer-executable instructions that, when executed by the processor, cause the processor to perform operations comprising
increasing a pressure control signal to a first one of the plurality of friction-locking shift elements during a shift of the automatic transmission from an initial gear to a subsequent gear such that a first one of the at least one positive-locking shift element synchronizes, the first one of the plurality of friction-locking shift elements being open in the initial gear and the subsequent gear of the automatic transmission, the first one of the at least one positive-locking shift element being open in the initial gear and closed in the subsequent gear of the automatic transmission;
commanding the first one of the at least one positive-locking shift element to adjust towards a closed configuration by increasing a pressure control signal to the first one of the at least one positive-locking shift element after synchronizing the first one of the at least one positive-locking shift element with the first one of the plurality of friction-locking shift elements;
determining at least one of an elapsed time from adjusting the first one of the at least one positive-locking shift element towards the closed configuration or a differential speed rotation of the first one of the at least one positive-locking shift element; and
shifting the automatic transmission to a substitute gear when:
(1) the elapsed time from adjusting the first one of the at least one positive-locking shift element towards the closed configuration reaches or exceeds a time limit;
(2) the differential speed rotation of the first one of the at least one positive-locking shift element reaches or exceeds a rotational speed limit; or
(3) both the elapsed time from adjusting the first one of the at least one positive-locking shift element towards the closed configuration reaches or exceeds the time limit and the differential speed rotation of the first one of the at least one positive-locking shift element reaches or exceeds the rotational speed limit,
wherein the first one of the at least one positive-locking shift element does not participate in the transmission of power between an input shaft and an output shaft of the automatic transmission in the substitute gear.

8. The transmission control device of claim 7, wherein the first one of the at least one positive-locking shift element is not commanded to adjust towards the closed configuration any further when the elapsed time from adjusting the first one of the at least one positive-locking shift element towards the closed configuration reaches or exceeds the time limit or when the differential speed rotation of the first one of the at least one positive-locking shift element reaches or exceeds the rotational speed limit.

9. The transmission control device of claim 7, wherein at least the elapsed time from adjusting the first one of the at least one positive-locking shift element towards the closed configuration is determined, wherein the automatic transmission is shifted to the substitute gear when the elapsed time from adjusting the first one of the at least one positive-locking shift element towards the closed configuration reaches or exceeds the time limit.

10. The transmission control device of claim 9, wherein the differential rotational speed of the first one of the at least one positive-locking shift element is also determined, wherein, the automatic transmission is shifted to the substitute gear when, prior to reaching or exceeding the time limit, the differential rotational speed reaches or exceeds the rotational speed limit.

11. The transmission control device of claim 7, wherein the computer-executable instructions further comprise terminating measures for releasing the first one of the at least one positive-locking shift element from an intermediate position upon reaching or exceeding the time limit, upon reaching or exceeding the rotational speed limit, or upon both reaching or exceeding the time limit and reaching or exceeding the rotational speed limit.

12. The transmission control device of claim 7, wherein the automatic transmission remains in the substitute gear until the first one of the at least one positive-locking shift element fully closes.

* * * * *